United States Patent
Ishigaki

(10) Patent No.: US 11,409,408 B2
(45) Date of Patent: Aug. 9, 2022

(54) DISPLAY APPARATUS AND NON-TRANSITORY COMPUTER READABLE MEDIUM STORING PROGRAM

(71) Applicant: FUJIFILM Business Innovation Corp., Tokyo (JP)

(72) Inventor: Toru Ishigaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 310 days.

(21) Appl. No.: 16/352,872

(22) Filed: Mar. 14, 2019

(65) Prior Publication Data
US 2019/0346991 A1 Nov. 14, 2019

(30) Foreign Application Priority Data
May 9, 2018 (JP) .............................. JP2018-090597

(51) Int. Cl.
| | |
|---|---|
| *G06F 3/04817* | (2022.01) |
| *G06F 9/30* | (2018.01) |
| *G06F 3/0485* | (2022.01) |
| *H04N 21/431* | (2011.01) |
| *G06F 3/04842* | (2022.01) |

(52) U.S. Cl.
CPC ........ *G06F 3/04817* (2013.01); *G06F 3/0485* (2013.01); *G06F 3/04842* (2013.01); *G06F 9/3004* (2013.01); *H04N 21/4316* (2013.01)

(58) Field of Classification Search
CPC .. G06F 3/04817; G06F 9/3004; G06F 3/0485; G06F 3/04842; G06F 3/0482; H04N 21/4316
See application file for complete search history.

(56) References Cited

U.S. PATENT DOCUMENTS

| | | | |
|---|---|---|---|
| 2008/0104511 A1* | 5/2008 | Chinnadurai | G06F 8/65 715/703 |
| 2009/0249418 A1* | 10/2009 | Alastruey Gracia | H04N 21/6125 725/114 |
| 2010/0228539 A1* | 9/2010 | Slocum | G06F 3/04886 704/9 |
| 2011/0072361 A1 | 3/2011 | Sakai et al. | |
| 2012/0120316 A1* | 5/2012 | Lee | H04N 21/42204 348/564 |

(Continued)

FOREIGN PATENT DOCUMENTS

| | | |
|---|---|---|
| JP | H05053273 | 8/1993 |
| JP | 2011066850 | 3/2011 |

(Continued)

OTHER PUBLICATIONS

"Office Action of Japan Counterpart Application" with English translation thereof, dated Feb. 1, 2022, p. 1-p. 6.

*Primary Examiner* — Michael Roswell
(74) *Attorney, Agent, or Firm* — JCIPRNET

(57) ABSTRACT

A display apparatus includes a switching unit that switches a display state of a second screen such that display targets displayed in a first screen are included at a certain ratio in a case where the first screen transitions to the second screen according to an operator and display targets displayed in the second screen and an arrangement of the display targets are changed from the display targets displayed on the first screen and an arrangement of the display targets.

15 Claims, 7 Drawing Sheets

(56) References Cited

U.S. PATENT DOCUMENTS

| | | | |
|---|---|---|---|
| 2014/0181992 A1* | 6/2014 | Janson | G06F 21/60 |
| | | | 726/27 |
| 2014/0355045 A1 | 12/2014 | Ishiyama et al. | |
| 2015/0074721 A1* | 3/2015 | Fishman | H04N 21/47205 |
| | | | 725/45 |
| 2015/0288836 A1 | 10/2015 | Kanki | |
| 2016/0295033 A1 | 10/2016 | Hirasawa | |
| 2018/0013900 A1 | 1/2018 | Hirasawa | |
| 2019/0068800 A1 | 2/2019 | Hirasawa | |
| 2019/0238689 A1 | 8/2019 | Hirasawa | |
| 2020/0045192 A1 | 2/2020 | Kanki | |

FOREIGN PATENT DOCUMENTS

| | | |
|---|---|---|
| JP | 2014235513 | 12/2014 |
| JP | 2015200940 | 11/2015 |
| JP | 2016189130 | 11/2016 |

* cited by examiner

| USER ID | USER NAME | PASSWORD | AUTHENTICATION STATE |
|---|---|---|---|
| User A | AAA | aa00aa | AUTHENTICATED |
| User B | BBB | bb11bb | - |
| ⋮ | ⋮ | ⋮ | ⋮ |

| USER ID | USER NAME | ICON INFORMATION |
|---|---|---|
| ALL | COMMON (NOT APPROVED) | App1, App2, ·····, AppK |
| User A | AAA | App2, App22, ·····, AppJ |
| User B | BBB | AppX, AppY, ·····, AppZ |
| ⋮ | ⋮ | ⋮ |

| APPLICATION | ICON |
|---|---|
| App1 | App1 |
| App2 | App2 |
| ⋮ | ⋮ |
| AppZ | AppZ |

DISPLAY APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-090597 filed May 9, 2018.

BACKGROUND

(i) Technical Field

The present invention relates to a display apparatus and a non-transitory computer readable medium storing a program.

(ii) Related Art

In recent years, a display apparatus that displays a menu screen (for example, home screen or like) and is excellent in operability has been proposed (for example, refer to JP2011-066850A).

The display apparatus described in JP2011-066850A is provided with a storage unit that stores operation history each time an operation is performed, a generation unit that acquires operation history information from the storage unit and generates recommendation information based on the operation history information in a case where a home screen, which is an operation start point, is displayed, and a display unit that displays the home screen that includes the recommendation information generated by the generation unit.

SUMMARY

Aspects of non-limiting embodiments of the present disclosure relate to a display apparatus and a non-transitory computer readable medium storing a program with which it is possible to perform a displaying operation such that a display target retrieved in a screen before transition is included even in a case where the display position of the display target is changed due to screen transition.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display apparatus including a switching unit that switches a display state of a second screen such that display targets displayed in a first screen are included at a certain ratio in a case where the first screen transitions to the second screen according to an operator and display targets displayed in the second screen and the arrangement of the display targets are changed from the display targets displayed on the first screen and the arrangement of the display targets.

BRIEF DESCRIPTION OF THE DRAWINGS

Exemplary embodiment(s) of the present invention will be described in detail based on the following figures, wherein:

FIG. 2 is a diagram illustrating an example of a user information table;

FIG. 3 is a diagram illustrating an example of a menu information table;

FIG. 4 is a diagram illustrating an example of image data;

FIG. 5A is a diagram illustrating an example of an initial screen of the first menu screen, and FIG. 5B is a diagram illustrating an example of the first menu screen after a scrolling operation;

FIG. 6A is a diagram illustrating an example of an initial screen of the second menu screen, and FIG. 6B is a diagram illustrating an example of the second menu screen including recommended applications;

DETAILED DESCRIPTION

Figure 1:
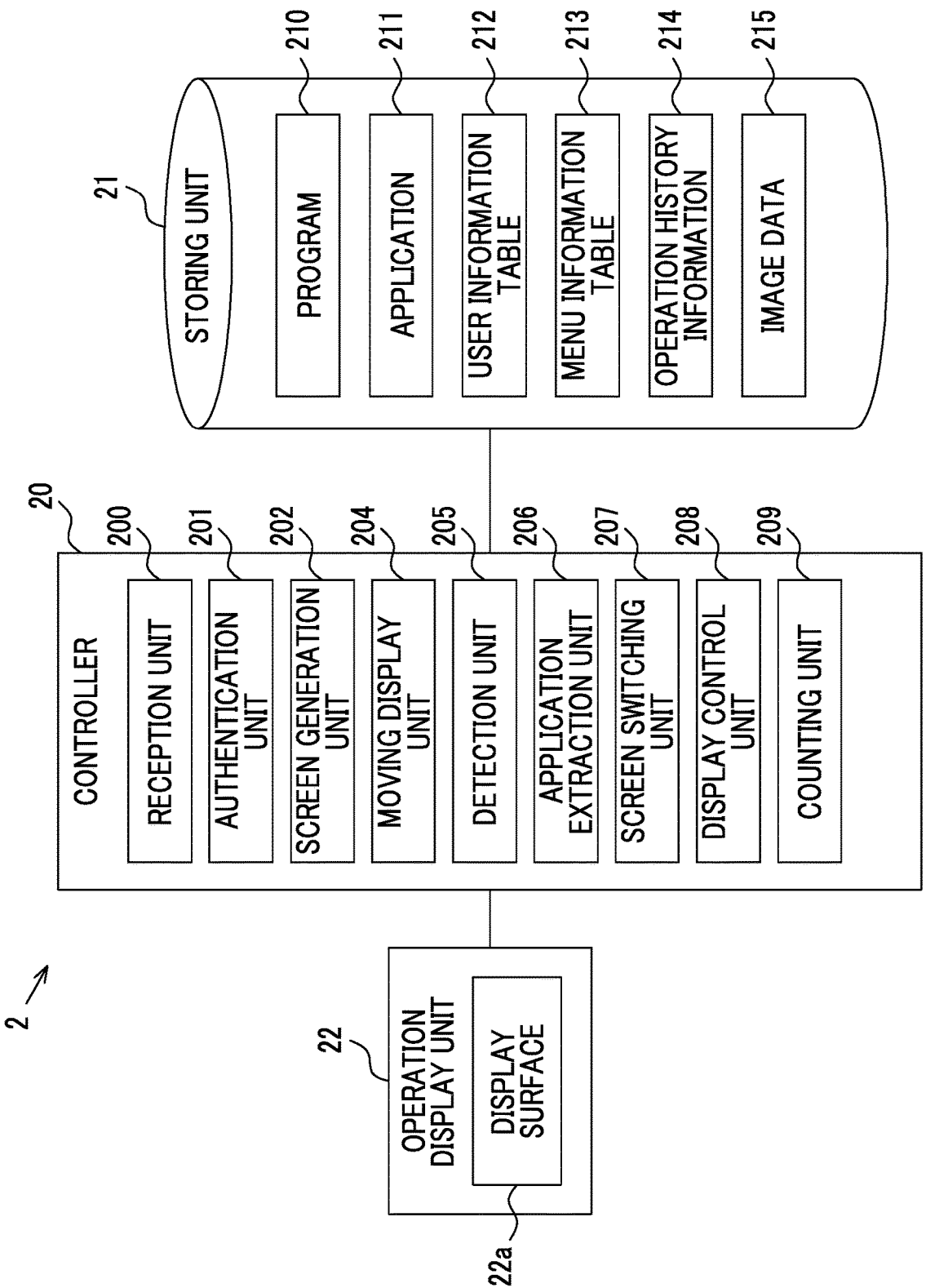
FIG. 1 is a block diagram illustrating an example of a control system of a display apparatus according to a first exemplary embodiment of the invention.

Hereinafter, exemplary embodiments of the present invention will be described with reference to the accompanying drawings. Note that, components having substantially the same functions are given the same reference numerals and repetitive description thereof will be omitted.

Summary of Exemplary Embodiments

A display apparatus according to the exemplary embodiments includes a switching unit that switches a display state of a second screen such that display targets displayed in a first screen are included at a certain ratio in a case where the first screen transitions to the second screen according to an operator and display targets displayed in the second screen and the arrangement of the display targets are changed from the display targets displayed on the first screen and the arrangement of the display targets.

The display target refers to an object displayed on a display surface. The display target corresponds to, for example, an icon that represents a function provided for the display apparatus. Details of the icon will be described later. The first screen is, for example, a screen that is displayed when there is no user authenticated. The second screen is, for example, a screen that is displayed when a specific operator is authenticated.

First Exemplary Embodiment

FIG. 1 is a block diagram illustrating an example of a control system of a display apparatus 2. Examples of the display apparatus 2 include a personal computer, an image forming apparatus, a tablet terminal, a multi-function cellular phone (smartphone), or the like. The display apparatus 2 is provided with a controller 20, a storing unit 21 that stores various data, and an operation display unit 22 to which information is input and that displays information.

The controller 20 is configured with a central processing unit (CPU), an interface, and the like. The CPU functions as a reception unit 200, an authentication unit 201, a screen generation unit 202, a moving display unit 204, a detection unit 205, an application extraction unit 206, a screen switching unit 207, a display control unit 208, a counting unit 209, or the like by being operated according to a program 210 stored in the storing unit 21. The application extraction unit 206 is an example of an extraction unit. Details of each unit will be described later.

The storing unit 21 is configured with a read only memory (ROM), a random access memory (RAM), a hard disk, and the like and stores various data such as the program 210, an application 211, a user information table 212, a menu information table 213, operation history information 214, image data 215, and the like. The storing unit 21 is an example of a storage unit. Note that, in the specification, an expression "record" is used for a case where information is written in a table and an expression "store" is used for a case where information is written in the storing unit.

Program 210 and Application 211

The program 210 causes each of the above-described units to function. The application 211 is software for executing various functions such as a copying function, a scanning function, a printing function, a faxing function, an e-mail function, a chat function, and a message communication function. Examples of the application 211 include a mobile application. In addition, examples of the application 211 include an application in which a specific value desired by an operator (hereinafter, also referred to as "user") has been set in a setting item for executing the above-described functions (for example, three A4 sheets have been selected for printing function).

Configuration of User Information Table 212

FIG. 2 is a diagram illustrating an example of the user information table 212. In the user information table 212, information for authentication of a user (hereinafter, simply referred to as "user authentication" in some cases) is registered. The user information table 212 is provided with, for example, a "user ID" column, a "user name" column, a "password" column, and an "authentication state" column. Note that, a column for recording data, which is obtained as the result of a counting operation performed by the counting unit 209 described later, may be further provided.

In the "user ID" column, a user ID for user recognition registered. In the "user name" column, a user name is registered. In the "password" column, information to be collated with a password input by a user is registered. In the "authentication state" column, information on whether authentication has been established or not is registered.

Menu Information Table 213

FIG. 3 is a diagram illustrating an example of the menu information table 213. The menu information table 213 is obtained by recording information related to icons 500 (refer to FIGS. 5A to 6B), which are included in the menu screen 5 that is displayed on a display surface 22a of the operation display unit 22 when a user logs in to the display apparatus 2, for each user. The menu information table 213 is provided with, for example, a "user ID" column, a "user name" column, and an "icon information" column.

Each icon 500 is an icon that represents a function executed by the application 211 with a figure. In addition to an icon that represents a function executed by the application 211 with a figure, examples of the icon 500 include a combination of an icon that represents a function with a figure and a text or a symbol and an icon that is configured with only a text or a symbol representing a function. The icon 500 is an example of a display target.

Note that, "All" shown in the "user ID" column represents information related to a time when there is no user authenticated, that is, information related to a case where any of users recorded in the user information table 212 has not logged in. In other words, "ALL" represents information common to all users, not information representing a specific user. Instead of "ALL", an expression "GUEST" or the like may also be used. "ALL" is an example of a first operator. A specific user other than "ALL" is an example of a second operator.

In the "icon information" column, a list of the names of the icons 500 related to applications that are selected in advance for each user and information showing the order in which the icons 500 are displayed are recorded. In the "icon information" column, the icons 500 are recorded in the order in which the icons are displayed in the menu screen 5. The order in which the icons 500 are displayed is the order in which the icons 500 on the menu screen 5 are arranged (for example, order to right lower side of screen starting from left upper side of screen).

Note that, information that indicates positions on the menu screen 5 at which the icons 500 are displayed (hereinafter, also referred to as "display positions") such as coordinate values on the menu screen 5 on which the icons 500 are displayed may be recorded instead of the order in which the icons 500 are displayed. Note that, icon information is an example of screen information.

Operation History Information 214

The operation history information 214 is obtained by recording operation information representing an operation such as a scrolling operation.

Image Data 215

FIG. 4 is a diagram illustrating an example of the image data 215. The image data 215 is obtained by recording the applications and the corresponding icons 500 (image data) in association with each other.

The operation display unit 22 is, for example, a touch panel display and has a configuration in which a touch panel is disposed to overlap a display such as a liquid crystal display. In addition, the operation display unit 22 is provided with the display surface 22a on which various screens are displayed.

Description on Each Unit

Next, each unit constituting the controller 20 will be described. The reception unit 200 receives various operations performed on the display surface 22a of the operation display unit 22. The reception unit 200 receives, for example, an authentication request which is a request for user authentication or an operation of moving the display positions of the icons 500 displayed on the display surface 22a in the vertical direction (scrolling operation or operation of switching page).

Note that, the authentication request may be made by inputting information representing a user (hereinafter, also referred to as "user information" (user name, user ID, password, or like)) through an operation performed on the operation display unit 22 and may be made by using an authentication medium such as non-contact type IC card.

The authentication unit 201 performs authentication of a user logging into the display apparatus 2. Specifically, the authentication unit 201 performs user authentication by collating user information included in the authentication request received by the reception unit 200 with information recorded in the user information table 212 of the storing unit 21.

The screen generation unit 202 acquires information of the menu information table 213 of the storing unit 21 and generates the menu screen 5 (refer to FIGS. 5A to 6B). Examples of the menu screen 5 include a menu screen that is displayed when there is no user authenticated (hereinafter, also referred to as "first menu screen 5A") and a menu screen that is displayed when a specific user has logged in, that is, the menu screen 5 that is displayed when the specific user has been authenticated (hereinafter, also referred to as "second menu screen 5B"). The first menu screen is an example of the first screen. The second menu screen 5B is an example of the second screen. Note that, the menu screen 5 may be referred to as a home screen.

Figure 5A:
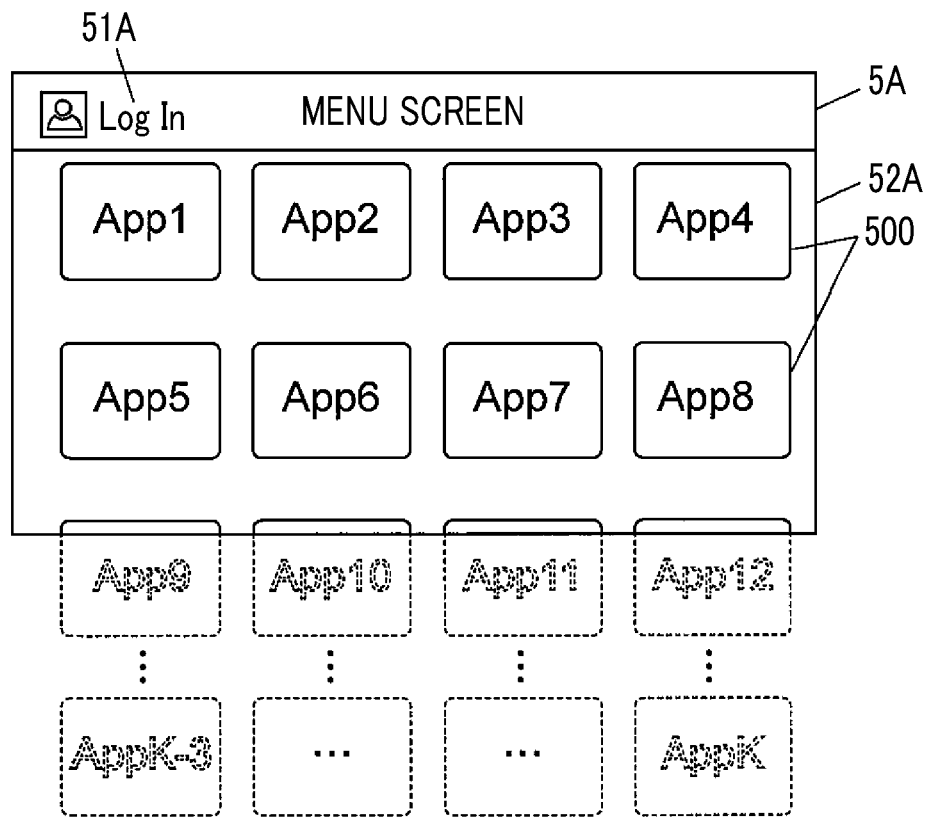
FIGS. 5A and 5B are diagrams illustrating an example of a first menu screen.
Figure 6A:
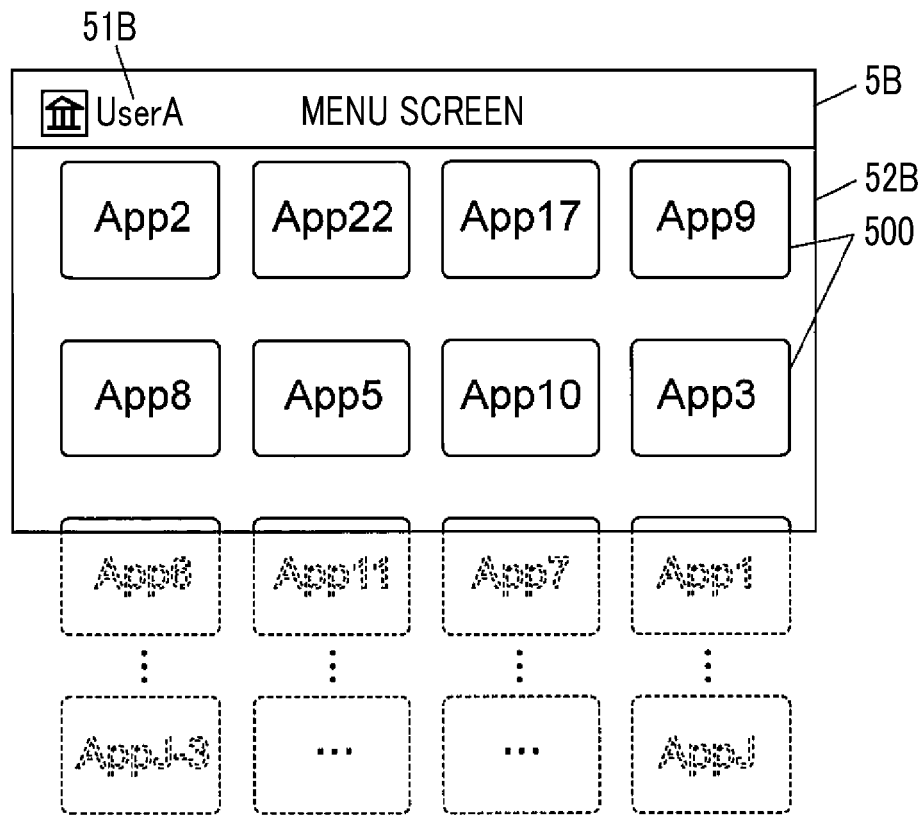
FIGS. 6A and 6B are diagrams illustrating an example of a second menu screen.
Figure 6B:
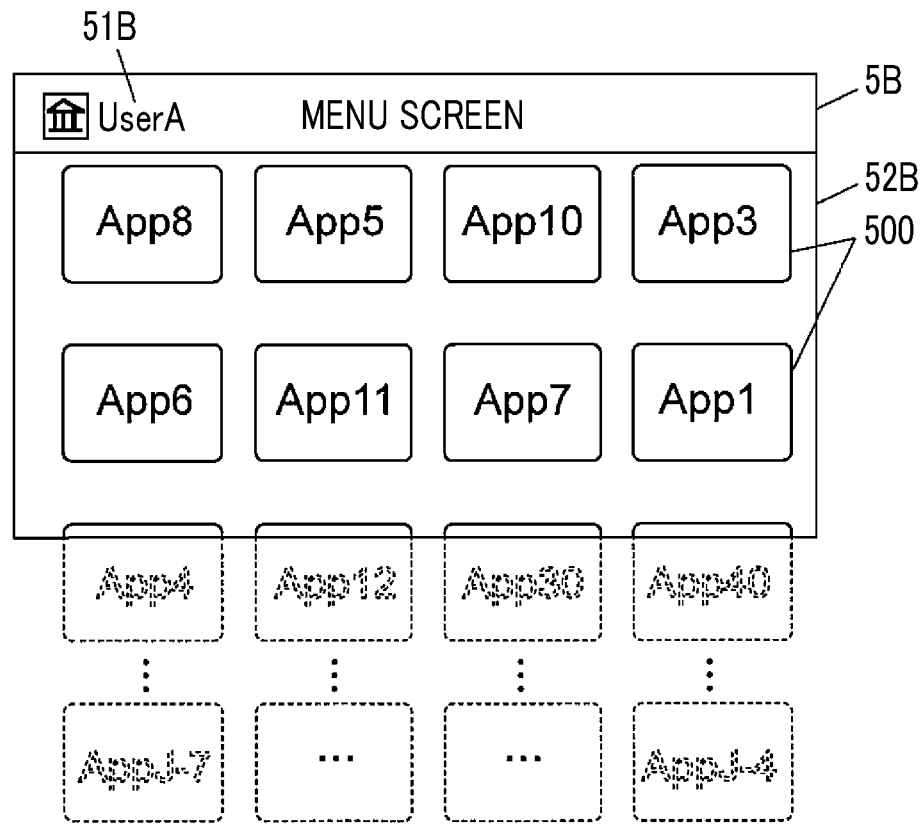

With reference to FIGS. 5A and 6B, the first menu screen 5A and the second menu screen 5B will be described. FIG. 5A is a diagram illustrating an example of an initial screen of the first menu screen 5A. FIG. 6A is a diagram illustrating an example of an initial screen of the second menu screen 5B.

As illustrated in FIG. 5A, the first menu screen 5A is configured to include a user name displaying region 51A on which a user name is displayed and an icon displaying region 52A on which the icons 500 are displayed. Note that, the icons 500 that are positioned outside the icon displaying region 52A (that is, icons 500 that are not displayed on display surface 22a) are illustrated with broken lines. Note that, in the description below, the expression "being displayed on the display surface 22a" also means being displayed in the icon displaying region 52A.

The first menu screen 5A is the menu screen 5 that is related to a common user recorded as "ALL" in the "user ID" column of the above-described menu information table 213. The first menu screen 5A is displayed when the display apparatus 2 is activated or returns from a resting state, for example.

As illustrated in FIG. 6A, the second menu screen 5B is configured to include a user name displaying region 51B on which a user name is displayed and an icon displaying region 52B on which the icons 500 are displayed, as with the first menu screen 5A.

The initial screen of the second menu screen 5B illustrated in FIG. 6A is generated for each of authenticated users according to icon information recorded in the menu information table 213 of the storing unit 21. Specifically, in the second menu screen 5B, the icons 500 that are selected in advance for each user are arranged in an arrangement set in advance. In other words, the second menu screen 5B is customized for each user.

The moving display unit 204 causes the icons 500 to be displayed on the display surface 22a of the operation display unit 22 according to an operation received by the reception unit 200 (for example, scrolling operation or operation of switching page) with the display positions of the icons 500 moved. In addition, the moving display unit 204 records operation information in the operation history information 214 of the storing unit 21.

Figure 5B:
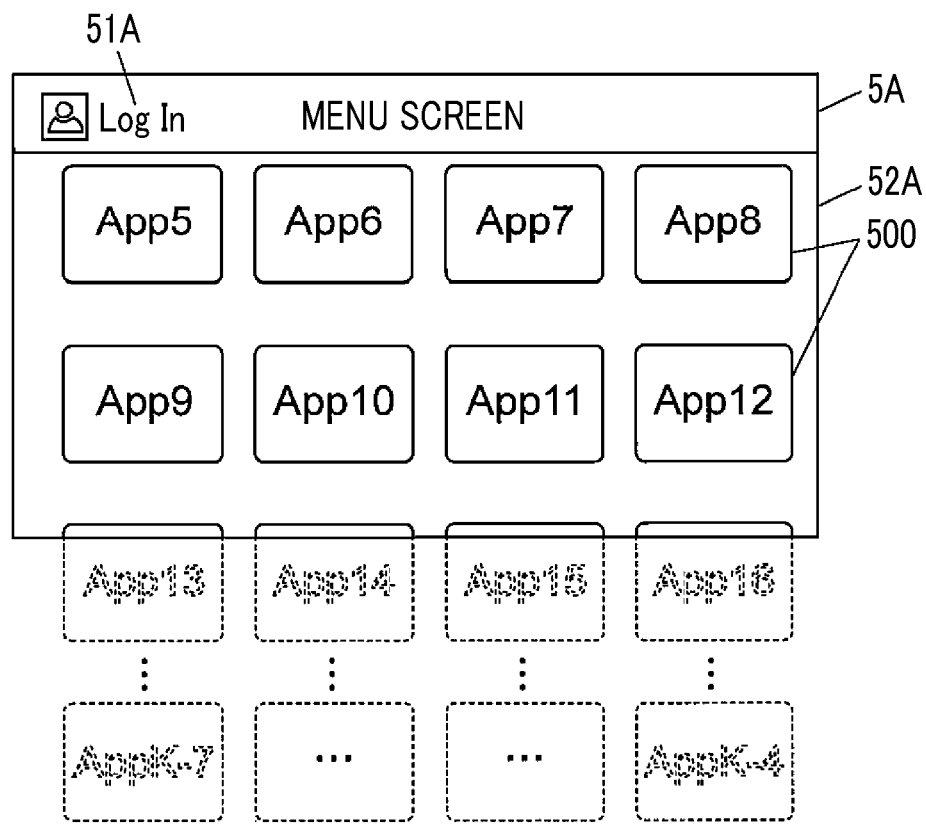

FIG. 5B is a diagram illustrating an example of the first menu screen after the scrolling operation. As illustrated in FIG. 5B, the moving display unit 204 causes the icons 500 (for example, in vertical direction in drawing) to be moved and displayed when the scrolling operation is performed. Note that, a direction in which the icons 500 are moved is not limited to the vertical direction in the drawing and may be a right-left direction in the drawing.

The detection unit 205 detects an operation that triggers a process of switching a display state, which is performed by the screen switching unit 207. Specifically, the detection unit 205 detects whether the following three operations have been performed in an order.

1. A scrolling operation performed on the first menu screen 5A.
2. An operation of authenticating a specific user that is performed by the authentication unit 201.
3. An operation of displaying the second menu screen 5B.

Regarding "1." described above, a case where the first menu screen 5A is scrolled up to the lowermost portion of the icon displaying region 52A and a case where the scrolling operation is not performed on the first menu screen 5A may be excluded from targets to be detected by the detection unit 205.

When the detection unit 205 detects the above-described operation, the application extraction unit 206 extracts the icons 500 that are displayed in the icon displaying region 52A in the first menu screen A displayed on the display surface 22a of the operation display unit 22 after the scrolling operation.

Specifically, the application extraction unit 206 extracts the icons 500 displayed in the icon displaying region 52A of the first menu screen 5A after the scrolling operation when the first menu screen 5A transitions to the second menu screen 5B and the icons 500 displayed in the second menu screen 5B and the arrangement thereof are changed from the icons 500 displayed in the first menu screen 5A after the scrolling operation and the arrangement thereof. Hereinafter, the extracted icons 500 may also be referred to as "recommended applications".

Specifically, the application extraction unit 206 extracts the icons 500 that are displayed in the icon displaying region 52A of the first menu screen 5A immediately before authentication while referring to the operation history information 214 of the storing unit 21 and acquiring operation information recorded until immediately before the authentication performed by the authentication unit 201.

The expression "immediately before the authentication" refers to the latest state displayed last before the authentication of the specific user. That is, the expression "immediately before the authentication" refers to the latest state before the transition to the second menu screen 5B. The "icons displayed on the display surface 22a" include only the icon 500 of which the entire portion is displayed in the icon displaying region 52A and may not include the icon 500 of which only a portion is displayed in the icon displaying region 52A.

For example, in the case of an example illustrated in FIG. 5B, the icon 500 of which the entire portion is displayed in the icon displaying region 52A corresponds to eight icons 500 of "App 5" to "App 12" and the icon 500 of which only a portion is displayed in the icon displaying region 52A corresponds to four icons 500 of "App 13" to "App 16" (refer to broken lines).

In addition, based on the following relational expression, the application extraction unit 206 calculates an index (hereinafter, also referred to as "similarity") that represents a ratio at which the icons 500 that are identical to the icons 500 extracted from the first menu screen 5A (recommended applications) are included in the icon displaying region 52B of the second menu screen 5B in a case where the icons 500 in the Nth row in the second menu screen 5B are displayed to be positioned on the upper most portion of the icon displaying region 52B.

Similarity=the number of recommended applications in the $N$th row+the number of recommended applications in the $(N+1)$th row.

Here, "N" is a natural number. In addition, the application extraction unit 206 outputs information (N) representing which row is highest in similarity.

For example, in a case where the recommended applications are "App 5" to "App 12" (FIG. 5B) and the second menu screen 5B is as in an example illustrated in FIGS. 6A and 6B, the values of similarity are as in following Table 1. As a result, N=2 at which the similarity becomes 5, which is highest, is output.

TABLE 1

| Nth Row | Recommended Applications | Number of Recommended Applications | Similarity |
|---|---|---|---|
| 1 | App 9 | 1 | 3 |
| 2 | App 8, App 5 | 2 | 5 |
| 3 | App 6, App 11, App 7 | 3 | 4 |
| 4 | App 12 | 1 | 1 |
| 5 | — | 0 | 0 |
| . | — | . | . |
| . |  | . | . |
| . |  | . | . |

Note that, the application extraction unit 206 may assign a weighting (for example. 0.0 to 1.0) according to the display mode of the icon 500. For example, the application extraction unit 206 may set the weighting of the icon 500 of which the entire portion is displayed in the icon displaying region 52A to 1.0 and may set the weighting of an icon of which only a portion (for example, only upper side or lower side) is displayed in the icon displaying region 52A to a value corresponding to the ratio of the area of a displayed portion to the area of the icon 500 (for example, 0.5 in case where half thereof is displayed).

In addition, the application extraction unit 206 may extract only the icons 500 that are related to applications, which a user who has logged in has the authority to use (also referred to "execution authority"), from among a plurality of icons 500 displayed in the icon displaying region 52A of the first menu screen 5A. In addition, the application extraction unit 206 may not perform a process of extracting the icons 500 in a case where the first menu screen 5A is scrolled up to the lowermost portion of the icon displaying region 52A or a case where the scrolling operation is not performed on the first menu screen 5A.

The screen switching unit 207 switches the display state of the second menu screen 5B. Specifically, the initial screen of the second menu screen 5B immediately after the authentication is displayed such that the icons 500 that are identical to the plurality of icons 500 extracted by the application extraction unit 206 are included at a certain ratio. That is, the display state of the second menu screen 5B is switched such that the plurality of extracted icons 500 are displayed in the icon displaying region 52B at a certain ratio.

For example, the screen switching unit 207 switches a screen by controlling the moving display unit 204 such that the icons 500 are displayed after being moved vertically. For example, the screen switching unit 207 may switch the display state of the second menu screen 5B by calculating a position to which the second menu screen 5B is to be scrolled (hereinafter, also referred to as "scroll position") according to a row that is highest in similarity, which is output by the application extraction unit 206, and scrolling the screen up to the calculated scroll position.

FIG. 6B is a diagram illustrating an example of the second menu screen 5B including the recommended applications. As illustrated in FIG. 6B, the second menu screen 5B including the recommended applications is generated such that the icons 500, which are extracted from the first menu screen 5A after the scrolling operation by the application extraction unit 206, are included in the icon displaying region 52B of the second menu screen 5B at a certain ratio.

For example, the screen switching unit 207 may switch the display state of the second menu screen 5B such that a ratio at which the icons 500, which are extracted from the first menu screen 5A after the scrolling operation by the application extraction unit 206, are included becomes highest by moving the display positions of the icons 500 such that the icons 500 in a specific row are positioned in the uppermost portion of the icon displaying region 52B.

The display control unit 208 performs control such that the menu screen 5 generated by the screen generation unit 202 is displayed on the display surface 22a of the operation display unit 22. In other words, in a case where a specific user is authenticated by the authentication unit 201, the display control unit 208 causes the first menu screen 5A to transition to the second menu screen 5B.

In addition, the display control unit 208 performs control such that the icon 500 is displayed in a predetermined specific display mode in a case where the icon 500 has an attribute of being not able to be displayed. Note that, the "attribute of being not able to be displayed" corresponds to a case where the authority to use an application related to the icon 500 has not been assigned to a user who has logged in as described above, for example. In this case, the display control unit 208 may perform control such that the icon 500 related to the application is displayed in a specific display mode (for example, grayout) that indicates the authority has not been assigned. Alternatively, the display control unit 208 may perform control such that the icon 500 related to the application, which the user does not have the authority to use, is not displayed in the first place.

The counting unit 209 counts the total number of functions of applications used by a user. For example, the counting unit 209 counts the total number of copies for each user.

Operation in First Exemplary Embodiment

Figure 7:
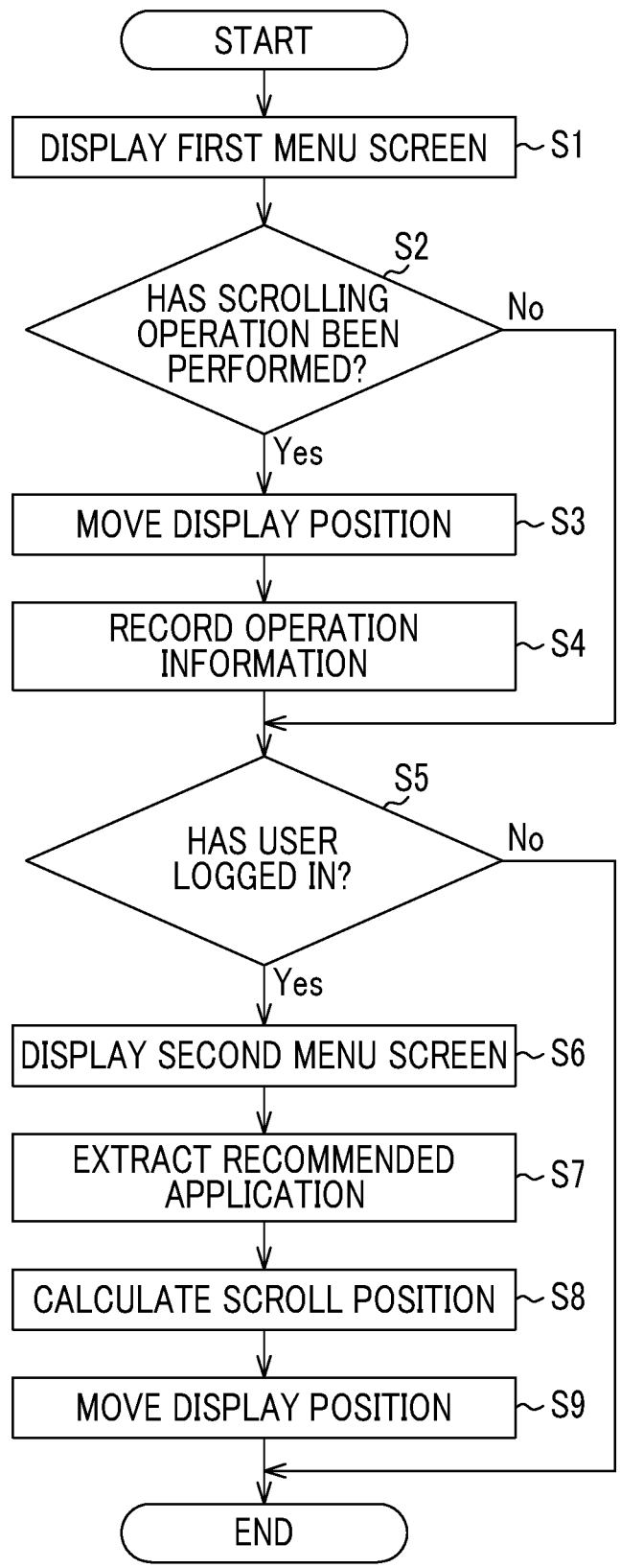
FIG. 7 is a flowchart illustrating an example of an operation of the display apparatus according to the first exemplary embodiment.

Next, an example of the operation of the display apparatus 2 will be described with reference to FIG. 7. FIG. 7 is a flowchart illustrating an example of the operation of the display apparatus 2. The display control unit 208 performs control such that the first menu screen 5A (refer to FIG. 5A) generated by the screen generation unit 202 is displayed on the display surface 22a of the operation display unit 22 (S1).

In a case where the reception unit 200 receives the scrolling operation performed on the operation display unit 22 (S2: Yes), the moving display unit 204 causes the icons 500 to be displayed with the display positions of the icons 500 moved (S3) (refer to FIG. 5B).

In addition, the moving display unit 204 records operation information in the operation history information 214 of the storing unit 21 (S4).

Next, in a case where the reception unit 200 receives a request for user authentication, the authentication unit 201 performs user authentication (S5). In a case where a specific user logs in, that is, in a case where the authentication unit 201 performs the user authentication (S5: Yes), the display control unit 208 performs control such that the second menu screen 5B (refer to FIG. 6A) generated by the screen generation unit 202 is displayed on the display surface 22a of the operation display unit 22 (S6). That is, the display control unit 208 causes the first menu screen 5A to transition to the second menu screen 5B.

Next, the application extraction unit 206 extracts the plurality of icons 500, which are displayed in the icon displaying region 52A of the first menu screen 5A immediately before the authentication, as the recommended applications while referring to the operation history information 214 of the storing unit 21 (S7). In addition, the application extraction unit 206 calculates the similarity for each of rows constituting the second menu screen 5B. In addition, the screen switching unit 207 calculates the scroll position according to the similarity (S8).

The screen switching unit 207 moves the display positions of the icons 500 according to the calculated scroll position (S9). In other words, the screen switching unit 207 switches the display state of the second menu screen 5B such that the recommended applications are included.

Second Exemplary Embodiment

Figure 8:
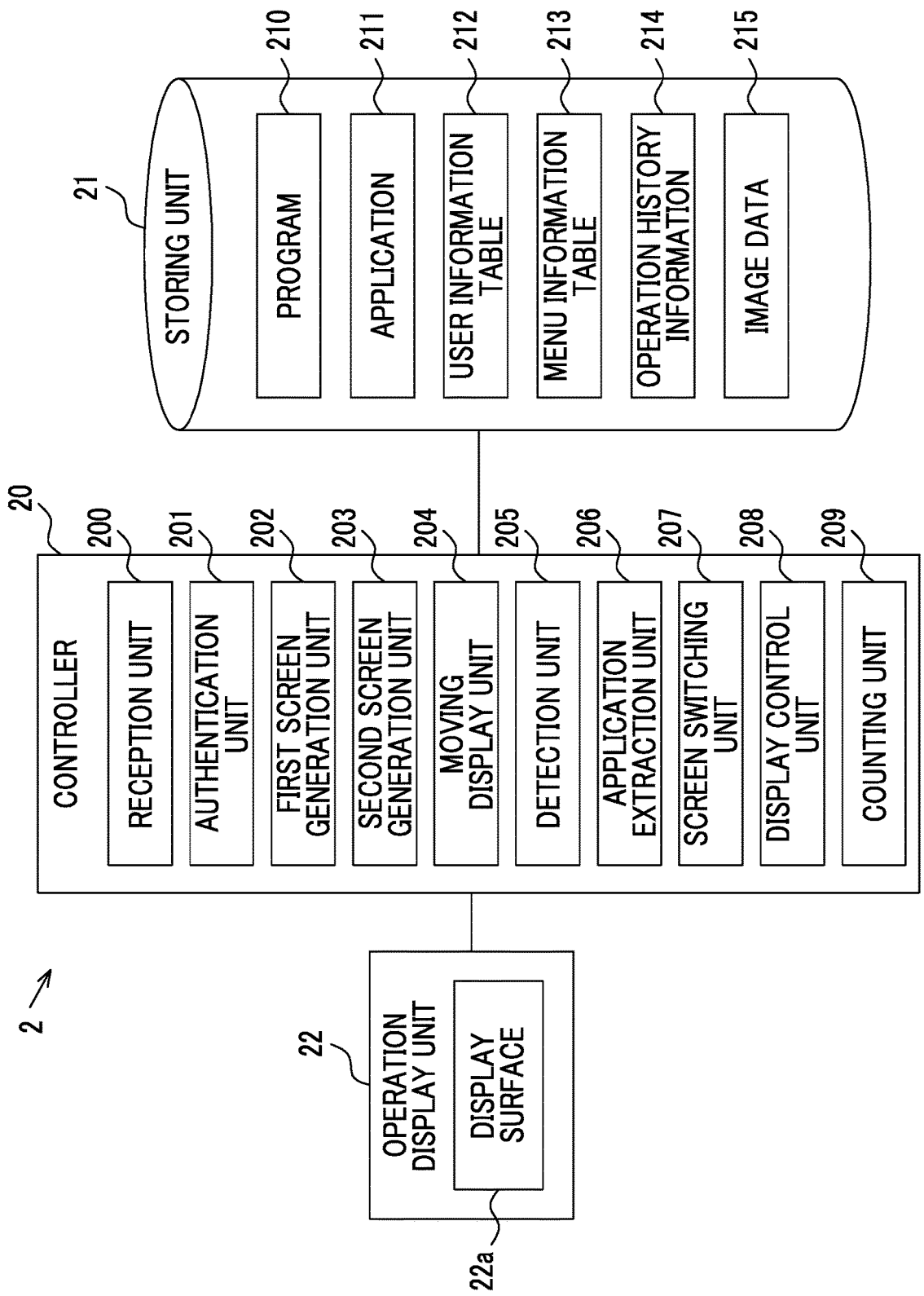
FIG. 8 is a block diagram illustrating an example of a control system of a display apparatus according to a second exemplary embodiment of the invention.

Next, a second exemplary embodiment of the invention will be described with reference to FIG. 8. FIG. 8 is a block diagram illustrating an example of a control system of the display apparatus 2 according to the second exemplary embodiment of the invention. The second exemplary embodiment is different from the first exemplary embodiment in a point that a second screen generation unit 203 that generates a recommended application screen 6 (refer to FIG. 9) including the icons 500 extracted by the application extraction unit 206 in a case where the screen generation unit 202 described in the first exemplary embodiment is the first screen generation unit 202. Hereinafter, the same components as those in the first exemplary embodiment will be given the same reference numerals, detailed description thereof will be omitted, and the following description will be made focusing on differences between the first exemplary embodiment and the second exemplary embodiment.

Figure 9:
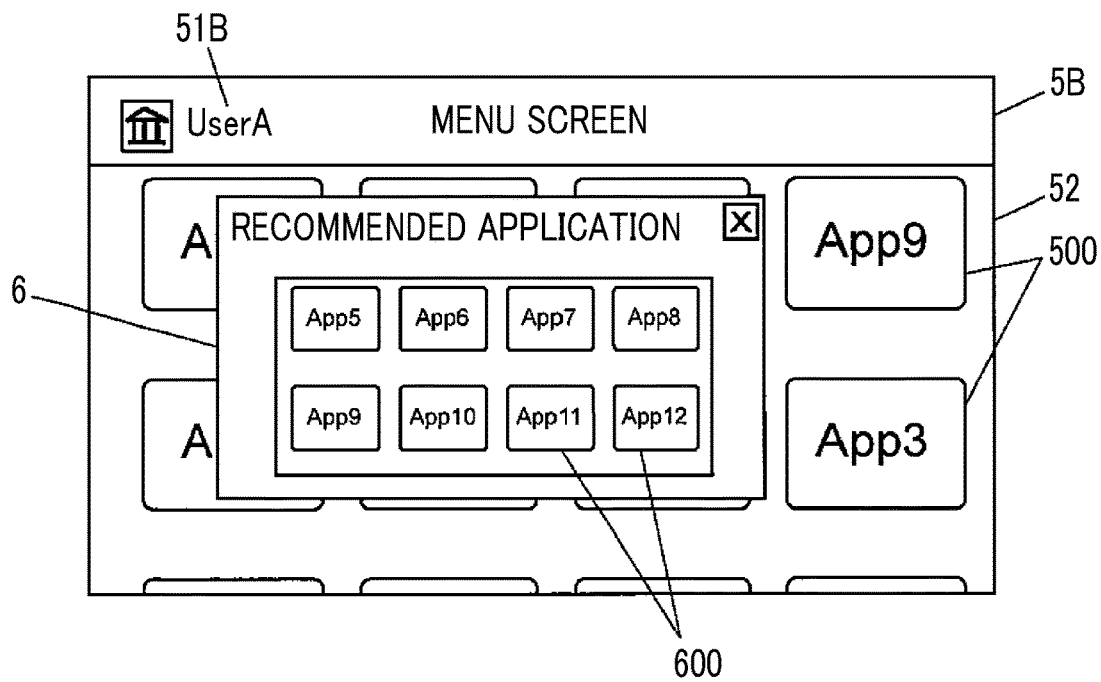
FIG. 9 is a diagram illustrating an example of the way in which a recommended application screen is displayed.

FIG. 9 is a diagram illustrating an example of the way in which the recommended application screen is displayed. As illustrated in FIG. 9, a plurality of icons 600 (hereinafter, also referred to as "reduced icons 600"), which are obtained by reducing the sizes of the icons 500 that are displayed on the first menu screen 5A immediately before a user logs in (immediately before the user is authenticated), are included in the recommended application screen 6. The recommended application screen 6 is an example of a third screen.

As illustrated in FIG. 9, the display control unit 208 may perform control such that the recommended application screen 6 is displayed in a superimposing manner as a pop-up screen while being superimposed on the second menu screen 5B. In this case, the screen switching unit 207 may perform a process of scrolling and switching the second menu screen 5B.

In addition, the reduced icons 600 included in the recommended application screen 6 may be acquired by the application extraction unit 206 referring to the operation history information 214 of the storing unit 21, for example.

Modification Example 1

Figure 10:
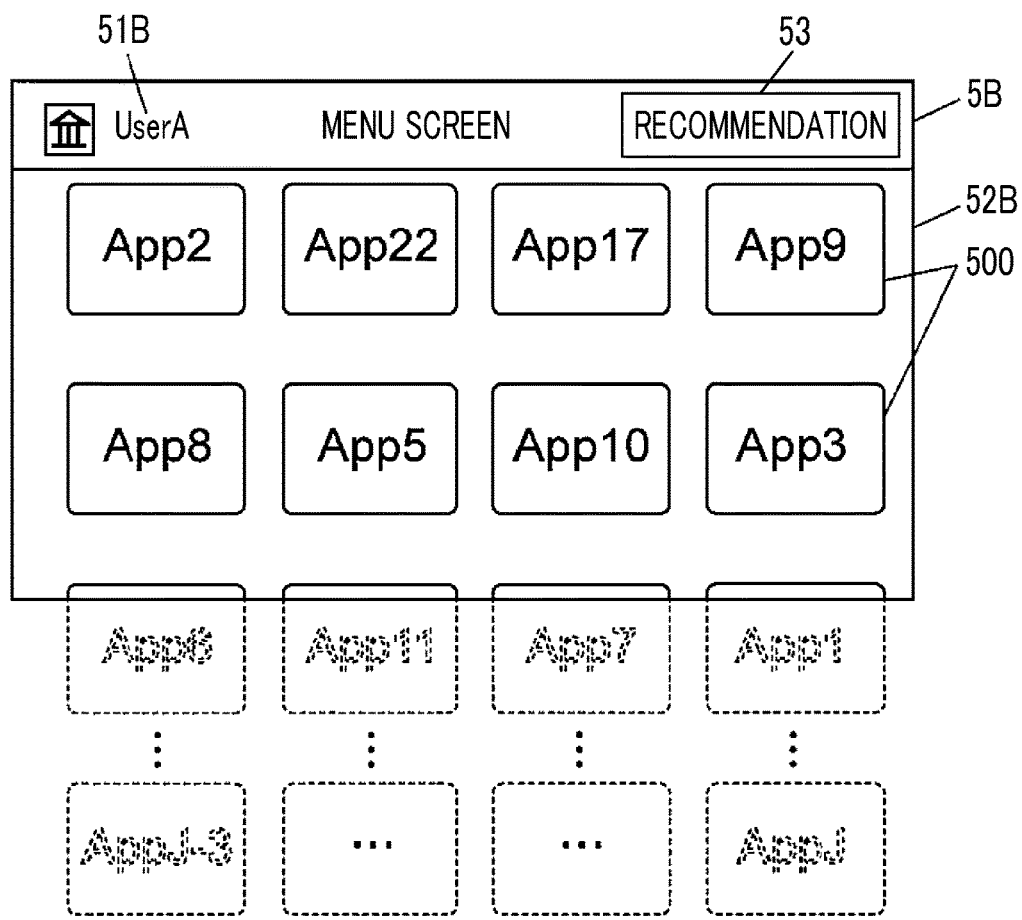
FIG. 10 is a diagram illustrating a modification example of the second menu screen.

FIG. 10 is a diagram illustrating a modification example of the second menu screen 5B. As illustrated in FIG. 10, a recommendation button 53 that is operated to call a recommended application list may be provided. In this case, the display control unit 208 may perform control such that the recommended application screen 6 is displayed when an operation of pressing the recommendation button 53 is performed by a user. The recommendation button 53 is an example of an operating element.

Modification Example 2

In addition, for example, in a case where the display apparatus 2 is a multi-function machine, an operation that triggers a process of switching the display state of the second menu screen 5B may be performed when an operation of adding an application is performed and the reception unit 200 receives the operation. Specifically, the detection unit 205 may determine that the operation that triggers the process of switching the display state of the second menu screen 5B has been performed when the following operations are performed.
1. An operation of adding an application.
2. An operation of displaying the second menu screen 5B.

The application extraction unit 206 sets the added application as a recommended application. Since the added application is displayed as a recommended application in this manner, the application can be executed immediately after being added.

Modification Example 3

In addition, in a case where the display apparatus 2 has a retrieving function of retrieving an application, the detection unit 205 may determine that the operation that triggers the process of switching the display state of the second menu screen 5B has been performed when the following operations are performed.
1. An operation of displaying the result of retrieval.
2. An operation of authenticating a specific user that is performed by the authentication unit 201.
3. An operation of displaying the second menu screen.

The application extraction unit 206 extracts an application, which is displayed as the result of retrieval performed before the second menu screen 5B is displayed, as a recommended application. In this manner, it is possible to start the application obtained as the result of retrieval without performing retrieval again after logging in.

Hereinabove, the exemplary embodiments of the invention have been described. However, the exemplary embodiments of the invention are not limited to the above-described exemplary embodiments and modification and implement can be made in various ways without departing from the gist of the invention. For example, in the above-described example, a case of scrolling in a vertical direction has been described as an example. However, the same applies to a case of scrolling in a lateral direction.

A portion of each unit in the controller 20 or the entire portion of each unit in the controller 20 may be configured with a hardware circuit such as a field programmable gate array (FPGA) or application specific integrated circuit (ASIC).

In addition, a portion of the components in the exemplary embodiments can be omitted or changed without departing from the gist of the invention. In addition, addition, deletion, change, substitution, or the like of steps can be made for the flow in the exemplary embodiments without departing from the gist of the invention. In addition, a program used in the exemplary embodiments may be provided while being recorded in a computer readable recording medium such as a CD-ROM and may be stored in an external server such as a cloud server such that the program can be used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display apparatus comprising:
   a switching unit that switches a display state from a first screen to a second screen in a case where the first screen transitions to the second screen according to an operator and display targets displayed in the second screen and an arrangement of the display targets are changed from the display targets displayed on the first screen and an arrangement of the display targets;
   a reception unit that receives an operation performed by the operator; and
   an extraction unit that extracts the display target, of which the entire portion is displayed in the first screen after a scrolling operation for the first screen is received by the reception unit, from among the display targets as extracted targets,
   wherein the display targets displayed in the second screen includes a part of the extracted targets,
   wherein the display targets displayed in the second screen are arranged according to similarity with an arrangement of the extracted targets.

2. The display apparatus according to claim 1,
   wherein the extraction unit extracts the display target while assigning a weighting to the display target according to a display mode of the display target.

3. The display apparatus according to claim 2, further comprising:
   a display control unit that performs control such that a third screen, which includes the display targets displayed in the first screen, is displayed while being superimposed on the second screen.

4. The display apparatus according to claim 2, further comprising:
   a display control unit that performs control such that the display target is displayed in a display mode according to an attribute of the display target.

5. The display apparatus according to claim 3, further comprising:
   an operating element that is operated to display the third screen.

6. The display apparatus according to claim 3, further comprising:
   the display control unit that performs control such that the display target is displayed in a display mode according to an attribute of the display target.

7. The display apparatus according to claim 1, further comprising:
   a display control unit that performs control such that a third screen, which includes the display targets displayed in the first screen, is displayed while being superimposed on the second screen.

8. The display apparatus according to claim 7, further comprising:
   an operating element that causes the third screen to be displayed.

9. The display apparatus according to claim 7, further comprising:
   the display control unit that performs control such that the display target is displayed in a display mode according to an attribute of the display target.

10. The display apparatus according to claim 1, further comprising:
    a display control unit that performs control such that the display target is displayed in a display mode according to an attribute of the display target.

11. The display apparatus according to claim 10,
    wherein the display control unit performs control such that the display target is displayed in a predetermined specific display mode in a case where the authority to use a function corresponding to the display target has not been assigned to the operator as the attribute of the display target.

12. The display apparatus according to claim 10,
    wherein the display control unit performs control such that the display target is not displayed in a case where the authority to use a function corresponding to the display target has not been assigned to the operator as the attribute of the display target.

13. The display apparatus according to claim 1,
    wherein the switching unit switches the display state of the second screen in a case where an operation of adding the display target is received.

14. A display apparatus comprising:
    a switching unit that switches a display state from a first screen to a second screen in a case where the first screen transitions to the second screen according to an operator and display targets displayed in the second screen and an arrangement of the display targets are changed from the display targets displayed on the first screen and an arrangement of the display targets;
    a reception unit that receives an operation performed by the operator;
    an extraction unit that extracts the display target, of which the entire portion is displayed in the first screen after a scrolling operation for the first screen is received by the reception unit, from among the display targets as extracted targets; and
    a display control unit that performs control such that a third screen, which includes the display targets displayed in the first screen, is displayed while being superimposed on the second screen,
    wherein the display targets displayed in the second screen includes a part of the extracted targets,
    wherein the display targets displayed in the second screen are arranged according to similarity with an arrangement of the extracted targets.

15. A non-transitory computer readable medium storing a program causing a computer to function as:
    a switching unit that switches a display state from a first screen to a second screen in a case where the first screen transitions to the second screen according to an operator and display targets displayed in the second screen and an arrangement of the display targets are changed from the display targets displayed on the first screen and an arrangement of the display targets;
    a reception unit that receives an operation performed by the operator; and
    an extraction unit that extracts the display target, of which the entire portion is displayed in the first screen after a scrolling operation for the first screen is received by the reception unit, from among the display targets as extracted targets,
wherein the display targets displayed in the second screen includes a part of the extracted targets,
wherein the display targets displayed in the second screen are arranged according to similarity with an arrangement of the extracted targets.

* * * * *